United States Patent
Demanze et al.

(10) Patent No.: US 9,618,419 B2
(45) Date of Patent: Apr. 11, 2017

(54) FLEXIBLE TUBULAR PIPE FOR TRANSPORTING A PETROLEUM FLUID SUCH AS A MULTIPHASE FLUID OR A GAS

(75) Inventors: Frédéric Demanze, Caudebec en Caux (FR); Antoine Felix-Henry, Rouen (FR); Thomas Epsztein, Voillecomte (FR); Patrice Jung, La Mailleraye sur Seine (FR); Jean-Christophe Bourget, Mont Saint Aignan (FR); Cécile Izarn, Tours (FR)

(73) Assignee: TECHNIP FRANCE (FR)

( * ) Notice: Subject to any disclaimer, the term of this patent is extended or adjusted under 35 U.S.C. 154(b) by 770 days.

(21) Appl. No.: 13/985,174

(22) PCT Filed: Feb. 17, 2012

(86) PCT No.: PCT/EP2012/052774
§ 371 (c)(1),
(2), (4) Date: Sep. 27, 2013

(87) PCT Pub. No.: WO2012/110637
PCT Pub. Date: Aug. 23, 2012

(65) Prior Publication Data
US 2014/0013829 A1    Jan. 16, 2014

(30) Foreign Application Priority Data
Feb. 18, 2011    (FR) ...................... 11 51360

(51) Int. Cl.
*F16L 11/10*    (2006.01)
*F16L 33/01*    (2006.01)
(Continued)

(52) U.S. Cl.
CPC ......... *G01M 3/2846* (2013.01); *F16L 11/083* (2013.01); *F16L 11/10* (2013.01);
(Continued)

(58) Field of Classification Search
CPC ... F16L 2201/30; G01M 3/328; G01M 3/2846
See application file for complete search history.

(56) References Cited

U.S. PATENT DOCUMENTS 5,654,499 A * 8/1997 Manuli ................... F16L 11/12
138/104
7,453,367 B2 * 11/2008 Spaolonzi ............. G01M 3/047
340/603

(Continued)

FOREIGN PATENT DOCUMENTS

DE    35 16 795 A1    11/1986
DE    196 01 652 A1    7/1997
(Continued)

OTHER PUBLICATIONS

International Search Report dated May 9, 2012 issued in corresponding International patent application No. PCT/EP2012/052774.

*Primary Examiner* — John Fitzgerald
(74) *Attorney, Agent, or Firm* — Ostrolenk Faber LLP

(57) ABSTRACT

The present disclosure relates to a flexible tubular pipe (1) of the unbonded type and including, from the inside to the outside, an internal carcass (2), first and second polymeric sheaths (3, 4), at least one tensile armor layer (6, 7) and a polymeric sealing sheath (8) and also at each of its ends, a connecting endpiece (10) comprising i.a., a tubular sleeve (15). The tubular sleeve (15) of a first endpiece (10) includes means (30, 31, 32) for draining the gases from the gap (25) between the sheaths (3, 4) towards the outside of the pipe (1) and the tubular sleeve of the second endpiece (10) including means for draining the gases from the gap (25) between two sheaths (3, 4) towards the outside or towards the inside of the pipe (1).

21 Claims, 6 Drawing Sheets

(51) Int. Cl.
*F16L 11/08* (2006.01)
*G01M 3/28* (2006.01)

(52) U.S. Cl.
CPC ............ *F16L 33/01* (2013.01); *G01M 3/283* (2013.01); *F16L 2201/30* (2013.01)

(56) References Cited

U.S. PATENT DOCUMENTS

| | | | | |
|---|---|---|---|---|
| 8,515,687 | B2* | 8/2013 | Pereira | F16L 11/127 702/179 |
| 9,217,526 | B2* | 12/2015 | Eccleston | F16L 11/12 |
| 2005/0072215 | A1* | 4/2005 | Booles | G01M 3/283 73/40.5 R |

FOREIGN PATENT DOCUMENTS

| | | |
|---|---|---|
| DE | 10 2004 002324 B3 | 1/2005 |
| EP | 0 695 902 A1 | 2/1996 |
| EP | 0 844 429 | 5/1998 |
| EP | 0 874 185 A1 | 10/1998 |
| EP | 1 939 510 A1 | 7/2008 |
| GB | 2 099 952 | 12/1982 |
| WO | WO 91/02232 A1 | 2/1991 |
| WO | WO 2009/132365 A2 | 11/2009 |
| WO | WO 2009/153451 | 12/2009 |

\* cited by examiner

FLEXIBLE TUBULAR PIPE FOR TRANSPORTING A PETROLEUM FLUID SUCH AS A MULTIPHASE FLUID OR A GAS

CROSS REFERENCE TO RELATED APPLICATIONS

The present application is a 35 U.S.C. §371 National Phase conversion of PCT/EP2012/052774, filed Feb. 17, 2012, which claims benefit of French Application No. 11 51360, filed Feb. 18, 2011, the disclosure of which is incorporated herein by reference. The PCT International Application was published in the French language.

BACKGROUND OF THE INVENTION

The present invention relates to a flexible pipe for transporting a petroleum fluid such as a multiphase fluid or a gas. More particularly it relates to a flexible pipe of the unbonded type for transporting hydrocarbon gases or biphasic hydrocarbons including a gaseous phase.

The invention also relates to a method for testing the seal of an interlayer space between two sheaths of such a flexible tubular pipe.

These flexible pipes, which are formed by an assembly of different concentric and superposed layers, are said to be of the unbonded type as soon as these layers have some freedom to move relatively to each other. These flexible pipes La. meet the recommendations of the normative documents API 17J <<Specification for Unbonded Flexible Pipe>>and API RP 17B<< Recommended Practice for Flexible Pipe>> established by the American Petroleum Institute.

Flexible tubular pipes include at each end, a connecting endpiece intended to ensure the connection of the pipes with each other or with terminal equipment and these endpieces should be made under conditions ensuring good firm attachment and a good seal.

The constitutive layers notably comprise polymeric sheaths generally providing a sealing function, and reinforcement layers intended for absorbing mechanical forces and formed with windings of sheets, metal wires, various strips or profiles in composite materials.

The flexible pipes of the unbonded type which are the most used in the off-shore petroleum industry generally comprise from the inside to the outside, an internal carcass consisting of a interlocked strip which is used for preventing the crushing of the pipe under the effect of the external pressure, at least one polymeric sealing sheath, a pressure vault consisting of at least one shaped metal wire, interlocked and helically wound with a short pitch, said pressure vault being used for absorbing radial forces related to the internal pressure, tensile armor layers formed with long-pitch helical windings of composite metal wires, said armor layers being intended for absorbing longitudinal forces to which the pipe is subject, and finally an external sealing sheath intended to protect the reinforcement layers from seawater.

When the pipe is intended for conveying hydrocarbons at a high temperature, typically between 100° C. and 130° C., the polymer seahg sheath, further called a pressure sheath, is generally made by extrusion of a polymer based on PVDF (polyvinylidene fluoride). This type of polymer however has the drawback of not being very ductile at low temperature so that it is necessary to ensure that the pressure sheath has good surface condition in order to avoid the fatigue breakage phenomenon under the effect of curvature variations. This is why in certain dynamic applications, a second polymeric sheath, a so-called sacrificial sheath, is interposed between the internal carcass and the pressure sheath in order to protect this pressure sheath against the roughnesses of the internal carcass. In this way, if a crack is initiated at the interface between the sacrificial sheath and the internal carcass, and then propagates until it passes right through the sacrificial sheath, it is stopped by the interface between the sacrificial sheath and the pressure sheath, so that the pressure sheath is protected.

A problem resulting from the transport of petroleum fluids at high temperature and pressure is related to the permeability of the polymeric sheaths. Indeed, diffusion of gas through the thermoplastics used for making the sealing sheaths increases with temperature and pressure.

Thus, during the transport of this type of high pressure and high temperature fluids, acid compounds such as hydrogen sulfide $H_2S$ and carbon dioxide $CO_2$, as well as steam tend to migrate through the polymeric sheaths until they reach the metal portions of the pipe and risk causing corrosion and embrittlement phenomena by hydrogen. These corrosion and embrittlement phenomena of the metal portions may affect the mechanical integrity of the pipe which is strongly stressed by the high pressures of the transported petroleum fluid and by the marine environment. This is why the metal layers are then made with special corrosion-resistant steels, but such steels have the drawbacks of being expensive or of having poor mechanical characteristics, which imposes an increase in the section and the weight of the metal portions.

Moreover, during the transport of multiphase fluids, diffusion of the gases through the polymeric sheaths causes an increase in the pressure around these sheaths. When this pressure becomes greater than the internal pressure prevailing in the pipe, such as for example during decompression following production stoppage, the pressure difference may lead to the collapse of the internal carcass. This diffusion phenomenon not only concerns the aforementioned gases, i.e. $H_2S$, $CO_2$ and steam, but also methane $CH_4$ which is generally present in a large proportion and under high pressure in the transported hydrocarbons, and the diffusion of which may consequently generate significant mechanical problems.

A solution for avoiding collapse of the internal carcass consists of increasing the thickness of the strip making up this carcass.

But this overdimensioning is expensive and especially has the drawback of increasing the weight of the pipe.

In order to avoid the corrosive effects of the acid compounds such as $H_2S$ and/or $CO_2$, it is known for example from documents EP 844429 and WO 2009/153451, how to introduce into a polymeric sheath, products which are chemically active towards said acid compounds so as to neutralize them. These chemically active products may be introduced into the sheath as particles or deposited at the surface.

But, the incorporation of this type of product in polymeric sheaths increases the manufacturing costs of flexible pipes equipped with these sheaths.

The goal of the invention is to find a remedy to the aforementioned drawbacks of the structures of the prior art by proposing a flexible tubular pipe which may be used for transporting under great pressure and high temperature, multiphase petroleum fluids or gases.

SUMMARY OF THE INVENTION

The object of the invention is therefore a flexible tubular pipe for transporting a petroleum fluid such as a multiphase fluid or a gas, said pipe being of the unbonded type and notably including first and second polymeric sheaths, at least one tensile armor layer and an external sealing polymeric sheath on the one hand and at each of its ends, a connecting endpiece i.a. comprising an end vault and a tubular sleeve partly inserted between the free ends of the two polymeric sheaths and cooperating with crimping means ensuring a sealing function on the other hand between the free end of the second sheath on the one hand and the end vault on the other hand, characterized in that the tubular sleeve of a first connecting endpiece includes means for draining gases from the gap between both sheaths towards the outside of the pipe and the tubular sleeve of the second connecting endpiece includes means for draining gases from the gap between both sheaths towards the outside of the pipe or towards the inside of said pipe.

The gases present in the gap between the first sheath and the second sheath are thus able to be discharged towards the outside of the pipe and/or towards the inside of the pipe at the internal volume of the petroleum fluid defined by the internal carcass or by the first sheath.

The first polymeric sheath advantageously forms a sacrificial sheath. The second polymeric sheath advantageously forms an internal sealing sheath or a pressure sheath.

In one alternative, the first polymeric sheath forms a pressure sheath and the second polymeric sheath forms an anti-permeability sheath or anti-$H_2S$ screen crimped at the endpieces to each of the ends of the pipe.

The flexible tubular pipe according to the invention may comprise one or more of the following features, taken individually or according to any technically possible combination(s):
- the pipe includes an internal carcass located inside the first and second polymeric sheaths and a pressure vault between the second polymeric sheath and said at least one armor layer,
- the endpiece provided with the tubular sleeve including means for draining the gases towards the outside comprises crimping means providing a sealing function between the first sheath on the internal carcass on the one hand and the corresponding tubular sleeve on the other hand,
- the means for draining gases towards the outside comprise at least one axial channel made in the thickness of the tubular sleeve and extending between an end edge of said tubular sleeve placed in the gap between both sheaths and an annular internal chamber made between the tubular sleeve, the end vault and the free end of the second sheath,
- the means for draining gases towards the outside comprise several axial channels shifted relatively to each other in the circumference of the corresponding tubular sleeve,
- the annular chamber communicates with the outside through a passage crossing the end vault and including an inlet orifice opening into said chamber and an outlet orifice opening out on the outside of the pipe,
- the outlet orifice of the passage is equipped with a differential valve,
- the outlet orifice of the passage is connected to a system for measuring the differential pressure of the gases between the outlet orifice of the passage and the inside of the pipe and/or to a gas analysis system,
- the outlet orifice of the passage is connected to a system for measuring the temperature of the gases and/or the flow rate of the gases,
- the means for draining gases towards the inside of the pipe include at least one axial channel made in the thickness of the tubular sleeve and extending between both edges of the ends of said tubular sleeve, and
- the means for draining gases towards the inside of the pipe comprise several axial channels shifted relative to each other in the circumference of the corresponding tubular sleeve.

Once the manufacturing of the pipe is finished and before it is conveyed and commissioned on a site for extracting hydrocarbons, a reception test (<<FAT>> for Factory Acceptance Test) described in the normative documents API 17J and API RP 17B is advantageously conducted in order to check the seal of the pressure sheath and to guarantee its integrity as well as the good performance of the crimping of the latter at each of the two ends of the pipe, intended to be fitted and crimped in an endpiece.

Presently, said <<FAT>> test only gives the possibility of testing the integrity of the pressure sheath, which is restrictive from the moment that the flexible tubular pipe comprises so-called interlayer spaces, between two polymeric sheaths and the seal of which would desirably be tested in order to guarantee optimum efficiency of the pipe. However, testing the seal of each interlayer space may have a risk for the flexible tubular pipe since pressurizing these interlayer spaces is not trivial and may cause a risk of collapse of the internal carcass.

The invention also relates to a method for testing the seal of an interlayer space of a flexible tubular pipe notably as defined above, comprising the steps of:
a) pressurizing an inner fluid transport volume space ($V_i$) to a first pressure ($P_i$);
b) stabilizing the pressure ($P_i$) in the inner volume space $V_i$;
c) measuring the pressure ($P_{ei}$) within the interlayer space (ei).

The method for testing the seal of an interlayer space of a flexible tubular pipe according to the invention may comprise one or more of the following steps, taken individually or according to any technically possible combination(s):
- it includes after step b), a step $b_1$) for having the inner space fluidically communicate with the interlayer space, and then a step $b_2$) for pressurizing the inner space and the interlayer space at the pressure set in step a);
- it comprises after step c), a step for depressurizing the inner space, the inner space and the interlayer space being connected together;
- it comprises after step c) a step $e_l$) for depressurizing the interlayer space by opening at least one tapping;
- it comprises between step b) and step c), a step d) for measuring the pressure within the inner space;
- it comprises after step d), a step $d_2$) for depressurizing the inner volume space to an intermediate pressure below the first pressure;
- it includes between step d) and step c), a step $f_2$) for pressurizing the volume of the interlayer space to a pressure above the intermediate pressure and less than or equal to the first pressure set in step a);
- it includes after step c), a step $g_2$) for depressurizing the interlayer space, advantageously followed by depressurization of the inner volume space;
- the fluid used for pressurizing at least one of the spaces of the conduit is selected from a gas and a liquid.
- step c) is carried out by means of a pressure measurement system, notably a pressure sensor,
- step d) is carried out by means of a pressure measurement system, notably a pressure sensor.

BRIEF DESCRIPTION OF THE DRAWINGS

The invention will be better understood upon reading the description which follows, only given as an example and made with reference to the appended drawings, wherein.

DESCRIPTION OF PREFERRED EMBODIMENTS

Figure 1:
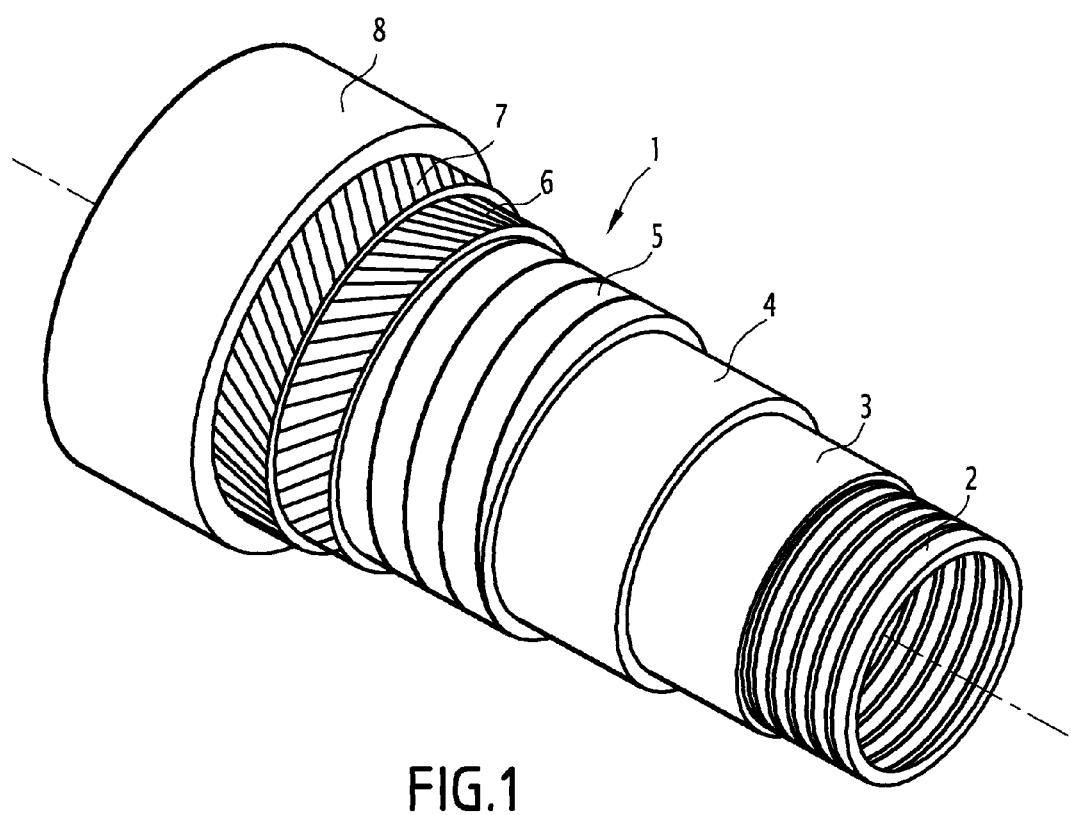
FIG. 1 is a perspective and partial view of a flexible tubular pipe for transporting a petroleum fluid such as multiphase fluid or a gas.

In FIG. 1, a flexible tubular pipe 1 is partly illustrated, intended for off-shore petroleum exploitation, and more particularly for transporting a petroleum fluid such as a multiphase fluid or a gas containing water steam and/or acid compounds such as hydrogen sulfide and/or carbon dioxide and/or methane. It is of the unbonded type and meets the specifications defined in the normative documents API 17J, API RP 17B.

The flexible tubular pipe 1 comprises from the inside to the outside:
- an internal carcass 2 consisting of a wound, profiled and interlocked metal strip according to a short-pitch helix, typically with a helix angle comprised between 70° and 90°, and intended for withstanding crushing under the effect of the external pressure applied to the pipe,
- a first polymeric sheath 3 of small thickness, a so-called <<sacrificial sheath>>,
- a second sealing polymeric sheath 4 or <<pressure sheath>>, said sheaths 3 and 4 being made by extrusion of a polymeric material, generally selected from polyolefins, polyamides and fluorinated polymers,
- a pressure vault 5 made in metal wire for example interlocked, helically wound with a short pitch, typically with a helix angle comprised between 70° and 90°, and ensuring resistance to the internal pressure in the pipe 1,
- at least one tensile armor layer 6 and in the exemplary embodiment illustrated in FIG. 1, two crossed tensile armor layers 6 and 7 formed by metal wires wound as a long-pitch helix, typically according to angles comprised between 20 and 55°, and
- a polymeric sealing sheath 8 forming an external protection of the pipe 1.

This pipe 1 is of the unbonded type, i.e. the different layers making up this pipe 1 have some freedom for moving relatively to each other.

The pipe illustrated in FIG. 1 is of the <<rough-bore>> type, i.e. the fluid circulating in the pipe 1 is in contact with the internal carcass 2, said internal carcass 2 being the first layer starting from the inside.

Alternatively, the pipe may be of the <<smooth bore>> type, i.e. the pipe 1 does not include any internal carcass 2, the first layer starting from the inside being a polymeric sheath in this case.

According to other embodiments, the polymeric sheaths 3 and 4 may be inserted between the pressure vault 5 and the armor layer 6 or further between both armor layers 6 and 7.

According to another alternative, the pipe 1 does not include any pressure vault 5 and in this case, the ±55° crossed armor layers provide both functions of absorbing the tension and of absorbing the internal pressure.

According to still another alternative, both polymeric sheaths 3 and 4 form the pressure vault 5.

The flexible tubular pipe 1 at each of its ends includes a connecting endpiece 10 intended to ensure the connection of the pipes with each other or with terminal equipment and these endpieces may be made under conditions ensuring both good firm attachment and a good seal.

Indeed, the connecting endpieces 10 may provide several functions which are notably the anchoring of the tensile armors 6 and 7 as well as the crimping and the sealing of the free ends of the different polymeric sheaths 3, 4 and 8.

Figure 4:
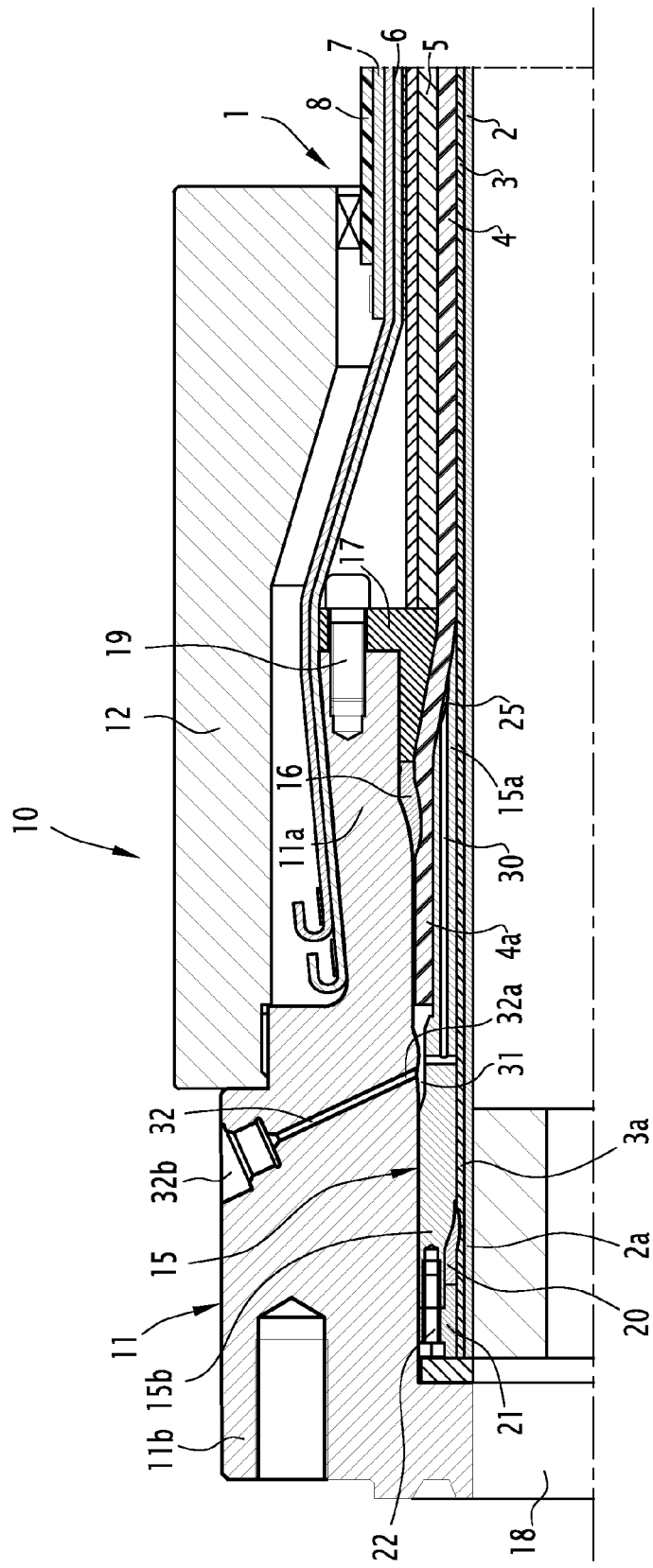
FIG. 4 is a schematic and partial, axial sectional half-view of a first embodiment of a connecting endpiece of a flexible tubular pipe, according to the invention.
Figure 5:
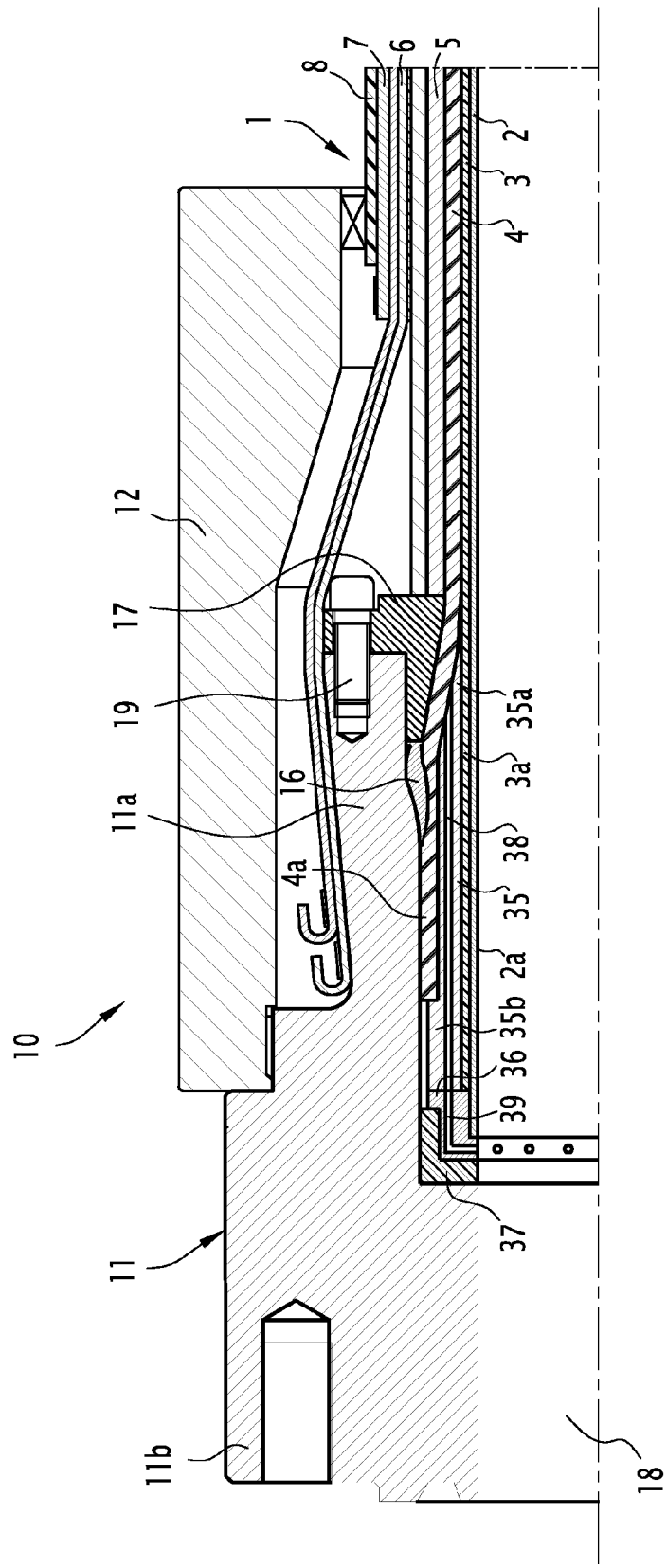
FIG. 5 is a schematic and partial, axial sectional half-view of a second embodiment of a connecting endpiece of a flexible tubular pipe according to the invention.

In FIGS. 4 and 5, is illustrated an end of the flexible tubular pipe 1 equipped with a connecting endpiece 10.

In these figures, the common elements are designated with the same references and only the elements facilitating the understanding of the invention have been illustrated, the other elements having been suppressed.

Generally, the endpiece 10 comprises an end vault 11 including a front portion 11a intended for the attachment of the tensile armors 6 and 7 by known means, not shown, and a rear portion 11b intended for the attachment on another connecting endpiece or to terminal equipment. This end vault 11 has a cylindrical central bore 18 with an internal diameter substantially equal to the internal diameter of the internal carcass 2, and the function of which is to ensure the flowing of the fluids transported by the pipe 1. This central bore 18 is placed beside the free end 2a of the internal carcass 2, coaxially with the latter, so as to ensure a continuous flow of the fluids between the pipe 1 and the endpiece 10.

The front portion 11a of the end vault 11 is covered with a cover 12 which also extends above the free end of the polymeric sealing sheath 8 and of the tensile armor layers 6 and 7.

The vault 11 extends above the free ends 2a, 3a and 4a, of the internal carcass 2, of the first polymeric sheath 3 and of the second polymeric sheath 4, respectively.

A tubular sleeve 15 is partly inserted between the free ends 4a and 3a, of the two polymeric sheaths 4 and 3, respectively. For this, the tubular sleeve 15 includes a wedge-shaped front portion 15a placed between the free end 4a of the second polymeric sheath 4 and the first polymeric sheath 3 and a rear portion 15b covering the free end 3a of the first polymeric sheath 3. The tubular sleeve 15 is held in this position by the internal wall of the end vault 11.

The free end 4a of the second sheath 4 is held on the front portion 15a of the tubular sleeve 15 by crimping means 16 interposed between said free end 4a of the second sheath 4 and the internal wall of the front portion 11a of the vault 11. The means 16 provide a sealing function between the first sheath 3 on the one hand and the tubular sleeve 15 on the other hand. Conventionally, these means advantageously appear as a cone 16 blocked in the crimping and sealing position by a flange 17. The flange 17 is attached on the front portion 11a of the end vault 11 for example with screwing members 19. Other crimping and sealing means may be used alternatively, notably O-ring gaskets or special gaskets of the type of those described in document WO2004/01269.

Thus, the cone 16 has the role of providing the seal between the second polymeric sheath 4 and the end of vault 11.

In the embodiment illustrated in FIG. 4, crimping and sealing are achieved between the free end 3a of the first polymeric sheath 3 and the tubular sleeve 15. These functions are obtained by the crimping means 20 providing a sealing function between the first sheath 3 on the one hand and the tubular sleeve 15 on the other hand. These means comprise a cone 20 inserted between the free end 3a of said polymeric sheath 3 and the rear portion 15b of the tubular sleeve 15. The cone 20 which ensures the crimping of the free end 3a of the first polymeric sheath 3 on the internal carcass 2 is held in position by a flange 21 attached on the rear portion 15b of the tubular sleeve 15 for example by screwing members 22.

During the circulation of the petroleum fluid inside the pipe 1, gases such as hydrogen sulfide and/or carbon dioxide and/or methane diffuse through the internal carcass 2 and the polymeric sheaths 3 and 4, and risk accumulating in the gap 25 between said polymeric sheaths. This accumulation of gas may cause a rise in pressure at this gap 25 which risks causing collapse of the internal carcass 2 during too rapid depressurization of the pipe 1. Indeed, if the depressurization is too rapid, the pressure inside the pipe 1 risks falling much more rapidly than the pressure at the gap 25 because of the difficulty of discharging the gases accumulated at the gap 25. As permeation phenomena through the sheaths are very slow, the essential part of the discharge of the accumulated gases is accomplished axially along the interface and towards the endpieces. During decompression, because of the overpressure at the gap 25, both sheaths 3 and 4 tend to be detached by a few tens of millimeters while generating annular play at their interface, a play along which the gases may be discharged towards the endpieces 10.

In order to facilitate this discharge by reducing the pressure losses at the endpiece 10, the tubular sleeve 15 of the connecting endpiece 10, illustrated in FIG. 4, includes means for draining the gases from the gap 25 between both polymeric sheaths 3 and 4 towards the outside of the flexible tubular pipe 1.

As shown in FIG. 4, the means for draining the gases towards the outside comprise at least one axial channel 30 made in the thickness of the tubular sleeve 15 and extending between an end edge 15a of said tubular sleeve 15 and an annular internal chamber 31 made between the tubular sleeve 15, the end vault 11 and the free end 4a of the second polymeric sheath 4. Said at least one channel 15 opens at the gap 25 between both polymeric sheaths, 3 and 4 respectively.

Preferably the means for draining the gases towards the outside comprise several axial channels 30 shifted relatively to each other in the circumference of the tubular sleeve 15 and uniformly distributed over this circumference.

The annular chamber 31 communicates with the outside of the flexible tubular pipe 1 through a passage 32 crossing the vault 11. This passage 32 includes an inlet orifice 32a opening into the annular chamber 31 and an outlet orifice 32b opening onto the outside of the pipe 1.

In the embodiment illustrated in FIG. 5, a tubular sleeve 35 is inserted into the gap 25 between both polymeric sheaths 3 and 4. For this, the tubular sleeve 35 includes a wedge-shaped front portion 35a interposed between the free end 3a of the second polymeric sheath 4 and the first polymeric sheath 3 and a rear portion 35b extending beyond the free end 4a of the second polymeric sheath 4 and covering the first polymeric sheath 3.

In a way identical with the first embodiment illustrated in FIG. 4, the free end 4a of the second polymeric sheath 4 is held on the tubular sleeve 35 by a crimping and sealing cone 16 blocked in position by a flange 17, attached on the front portion 11a of the vault 11 by screwing members 19.

In this embodiment, the first polymeric sheath 3 is not attached on the tubular sleeve 35 through a crimping and sealing cone. The tubular sleeve 35 is blocked in position by rings 36 and 37 interposed between the rear portion 35b of the tubular sleeve 35 and an internal edge made inside the vault 11.

In order to avoid accumulation of gas in the gap 25 between both polymeric sheaths 3 and 4, the tubular sleeve 35 of the collecting endpiece 10 illustrated in FIG. 5, includes means for draining the gases towards the inside of the flexible tubular pipe 1. These draining means comprise at least one axial channel 38 made in the thickness of the tubular sleeve 35 and extending between both end edges of said tubular sleeve 35.

Preferably, the means for draining the gases towards the inside comprise several axial channels 38 shifted relatively to each other in the circumference of the tubular sleeve 35 and uniformly distributed over this circumference.

In the embodiment illustrated in FIG. 5, the ring 36 includes orifices 36a allowing gas to be conveyed towards the inside of the pipe 1.

According to another alternative, the tubular sleeve 35 and the ring 36 are solid. In this case, the gases diffuse towards the inside of the flexible pipe 1 through the gaps made between the tubular sleeve 35, and the first polymeric sheath 3 and the internal carcass 2. These gases cannot flow towards the outside of the pipe 1 because of the crimping and of the seal produced by the wedge 16 placed between the vault 11 and the free end of the second polymeric sheath 4.

In the case when the pressure sheath 5 is formed with both polymeric layers 3 and 4, the tubular sleeve 15 or 35 is also placed between two polymeric layers.

Figure 2:
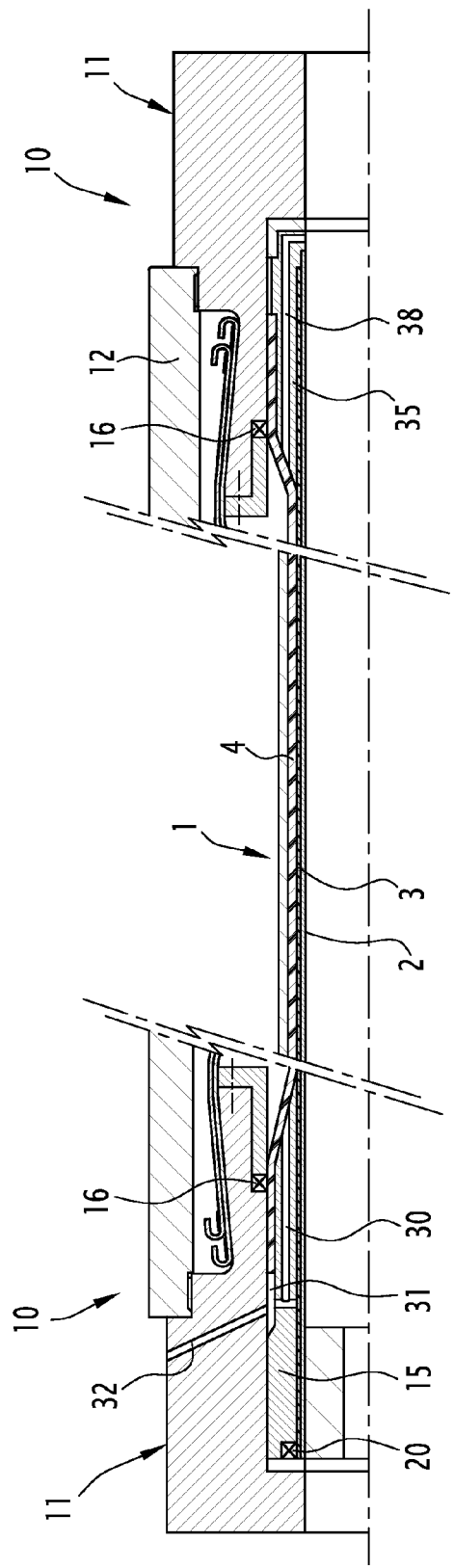
FIG. 2 is a diagram of a first embodiment of a flexible tubular pipe, according to the invention.
Figure 3:
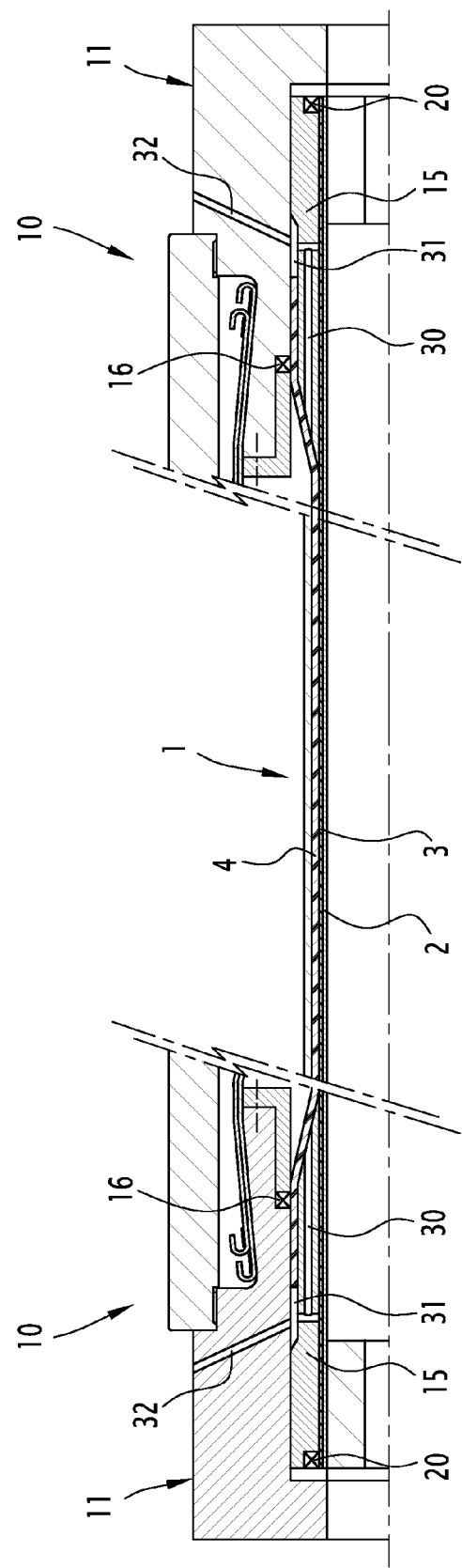
FIG. 3 is a diagram of a second embodiment of a flexible tubular pipe, according to the invention.

As shown in FIGS. 2 and 3, the flexible tubular pipe 1 is provided at each of its ends with a connecting endpiece 10.

According to the embodiment illustrated in FIG. 2, the pipe 1 comprises a first endpiece 10 including a tubular sleeve 15 provided with channels 30 for draining the gases from the gap 25 towards the outside via the passage 32 on the one hand, a second endpiece 10 including a tubular sleeve 35 provided with channels 38 for draining the gases from the gap 25 towards the inside of said pipe 1.

According to the embodiment illustrated in FIG. 3, the pipe 10 comprises two identical connecting endpieces 10 each including a tubular sleeve 15 provided with channels 30 for draining the gases from the gap 25 towards the outside of the pipe 1 via the passage 32.

The draining of the gases allows continuous purging of the interlayer between the polymeric sheaths during a rise in pressure at this interlayer for example during stoppage of production.

The outlet orifice 32b of the passage 32 may be equipped with a differential draining valve of the type of the one described in document WO 95/56045. Such a valve is intended to open as soon as the pressure prevailing in the annular chamber 31 is greater than a certain value.

The outlet orifice 32b of the passage 32 may also be connected to a gas analyzer of a known type, so as to quantify the gas composition at the gap 25 between both polymeric sheaths 3 and 4 notably with view to determining or not the presence of acid compounds such as hydrogen sulfide and/or carbon dioxide.

The outlet orifice 32b of the passage 32 may also be connected to a known system for measuring the pressure difference of the gases between this outlet orifice, i.e. the pressure prevailing at the gap 25 between the polymeric sheaths 3 and 4 and the inside of the pipe 1.

The outlet orifice 32b of the passage 32 may further be connected to a system for measuring the flow rate of the gases and/or to a sensor for measuring the temperature of the gases.

For example, this system comprises two pressure sensors, not shown, one measuring the pressure prevailing at the gap 25 and the other one measuring the pressure prevailing inside the pipe 1. The sensors are connected to a device, not shown, for recording and continuously processing the measurements.

By continuously controlling in real time this pressure difference, it is therefore possible to strongly reduce the risk of unacceptable overpressure which may cause collapse of the internal carcass of the pipe. Indeed, during gradual depressurization of the flexible pipe 1, the device allows automatic and fast triggering of an alarm so as to slow down the depressurization rate of this flexible pipe 1 in order to bring the pressure difference between the gap 25 on the one hand and the inside of the flexible pipe on the other hand back to an acceptable level. As soon as the pressure difference returns to an acceptable level, the depressurization rate inside the flexible pipe 1 may be increased.

Generally, the measurement device and/or the gas analyzer are placed at least at one connecting endpiece of an end of the flexible pipes, notably at the upper end of the rising pipes (<<risers>>) ensuring the connection between the sea bed and a support floating at the surface.

In an alternative, the pressure sheath 4 may be surmounted with another intermediate polymeric layer 9, for example an anti-permeability sheath or an anti-H$_2$S screen, crimped at the endpieces 10 to each of the ends of the pipe 1.

Figure 6:
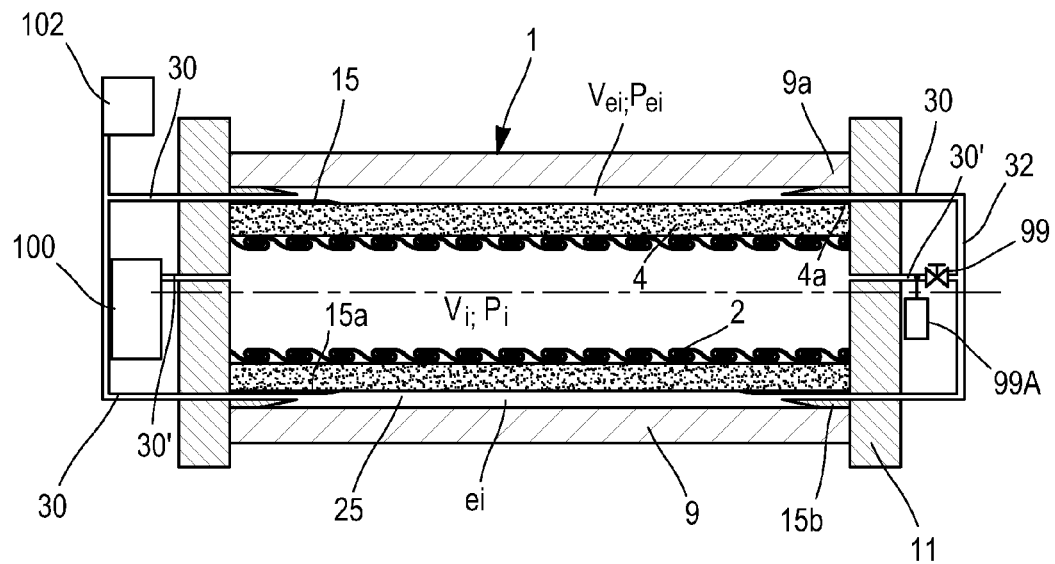
FIG. 6 is a simplified axial sectional view diagram of a first method for FAT testing an interlayer space of a flexible tubular pipe according to the invention.

According to a first test method, the whole of which is illustrated in FIG. 6, the structure of the flexible pipe 1 is only partly visible for better understanding said method. The pipe 1 includes an internal carcass 2 on which is extruded a pressure sheath 4. Around the pressure sheath 4 is extruded an anti-permeability sheath 9. At each end of the pipe 1, a tubular sleeve 15 is partly inserted between the respective free ends 9a and 4a of the two polymeric sheaths 9 and 4 as described above.

The tubular sleeve 15 includes a wedge-shaped front portion 15a placed between the free end 9a of the intermediate polymeric sheath 9 and the pressure sheath 4 and a rear portion 15b covering the free end 4a of the pressure sheath 4. The tubular sleeve 15 is held in this position by the internal wall of the end vault 11 of the connecting endpiece 10 (not shown).

In order to conduct the <<FAT>> test, at one of the two ends of the pipe 1, the inner volume space Vi, allowing transport of fluids when the pipe 1 is operating, is connected to at least one gap 25 between the pressure sheath 4 and the anti-permeability sheath 9 via at least one of the tubular sleeves 15 which defines at least one axial channel 30 opening into at least one passage 32.

Said or each passage 32 is connected to at least one additional channel 30', crossing the end vault 11 and opening inside the pipe 1, within said inner volume space $V_i$, without passing through the tubular sleeve 15.

A control valve 99 is interposed on the additional axial channel 30' for selectively opening or closing the channel 30'.

A sensor 99A for measuring the pressure in the inner volume space $V_i$ is tapped on the channel 30' between the inner volume space $V_i$ and the valve 99.

At the other end of the pipe 1, the inner volume space $V_i$ is connected via another additional channel 30' to a system 100 for pressurizing the inner volume space $V_i$.

The system 100 is for example a volumetric pump if the fluid used for the pressurization is a liquid or a compressor if the fluid used for the pressurization is a gas.

The additional axial channel 30' crosses the end vault 11 and opens into an inner volume space $V_i$ without passing through the tubular sleeve 15. At this same end of the pipe, at least on gap 25 between the sheaths 4, 9 is connected, via at least one second axial channel 30, to a pressure measurement system 102.

For example, the system 102 comprises a pressure probe, measuring the pressure prevailing at the gap 25. The probe is connected to a device, not shown, for recording and continuously processing the measurements.

The second axial channel 30 crosses the tubular sleeve 15 placed at this end of the pipe 1.

In order to carry out the tests, the starting of the volumetric pump or of the compressor of the system 100 causes pressurization of the inner volume space V, of the pipe 1. This generates a radial force which is radially applied outwards on the whole of the structure of the pipe 1, and more particularly on the internal carcass 2 and the pressure sheath 4 and the anti-permeability sheath 9.

The anti-permeability sheath 9 subject to this radial force is subject to irreversible plastic deformation by creep inside the gaps of the pressure vault (not shown). When the inner volume space $V_i$ has reached the test pressure $P_i$ (Pis for example at least 1.3 times the design pressure of the tested pipe, which is set), the remaining areas which one also wishes to test, are pressurized via at least one tubular sleeve 15 until the gap 25 defined between both sheaths 4 and 9 has attained the test pressure $P_i$.

The pressurization of the remaining areas is accomplished by opening the control valve 99 installed along an additional axial channel 30'.

The fluid present in the inner volume space $V_i$ flows into at least one of the passages 32, and then into at least one of the second channels 30 for pressurizing the gap 25.

If one waits for a sufficiently long time, an interlayer space ei defining a volume $V_{ei}$ is generated between the pressure sheath 4 and the intermediate sheath 9.

The volumetric pump is then stopped when the totality of the empty space is at the test pressure determined before the beginning of the <<FAT>> test, i.e. when the inner volume space $V_i$ and the interlayer space ei are both subject to the test pressure $P_i$.

The continuation of the test first of all comprises a stabilization phase for at least two hours of the pressure within the pipe 1 in order to check the temperature and pressure equilibrium of the system, i.e., check that the pressure remains substantially the same over a short period. For this purpose a 1% variation over a period of one hour is acceptable as notably indicated by the API 17J standard, paragraph 10.3.1.3.

The continuation of the test then comprises a phase for maintaining the tubular pipe 1 under pressure for a period ranging from a few hours, for example during a minimum of 24 hours as recommended by the Standard API 17J paragraph 10.3.1.5 to a few days.

Subsequently, the pressure difference which may exist between the inner volume space $V_i$ and the interlayer space ei is regularly measured (for example every 30 minutes according to the API 17J standard paragraph 10.3.1.5) by means of the pressure sensors 99A, 102. To do this, the pressure $P_i$ within the inner volume space $V_i$ and the pressure $P_{ei}$ within the interlayer space ei are measured.

If a minute or quasi-zero pressure difference is measured, i.e. if the observed pressure fluctuations are less than or equal to 4% of the test pressure set beforehand, this means that the inner volume space $V_i$ and the interlayer space ei are subject to the same pressure. The sheaths 4 and 9 are then considered as being perfectly intact.

Conversely, if the pressure difference measured by the pressure sensors 99A, 102 is non-zero or varies significantly (pressure variations of more than 4% of the initial test pressure) as compared with what is imposed by the API 17J standard of January 2009 at paragraph 10.3.2, this means that the seal of the pipe 1 is not total. This means that in at least one point of the pipe 1 and more particularly at the pressure sheath 4 or at the anti-permeability sheath 9, at least one defect exists which does not allow a perfect seal of the pipe 1 to be ensured. Therefore, its delivery and its installation on site cannot be approved favorably.

Finally, the flexible tubular pipe 1 is depressurized in a controlled way, i.e. set values of the depressurization rate imposed by the manufacturer are observed. Here, the maximum depressurization rate is set to 100 bars per hour for depressurization down to a pressure comprised between 5 and 20 bars.

Such a precautionary step is desirable if the intention is not to cause collapse of the internal carcass 2 on itself. Depressurization may be accomplished by reducing in a controlled way the pressure prevailing within the inner volume space $V_i$, the valve 99 being open, i.e. by reducing the pressure by tapping operations within the interlayer space ei. Preferentially, it is proceeded with depressurization of the pipe 1 by tapping operations within the interlayer space ei.

Figure 7:
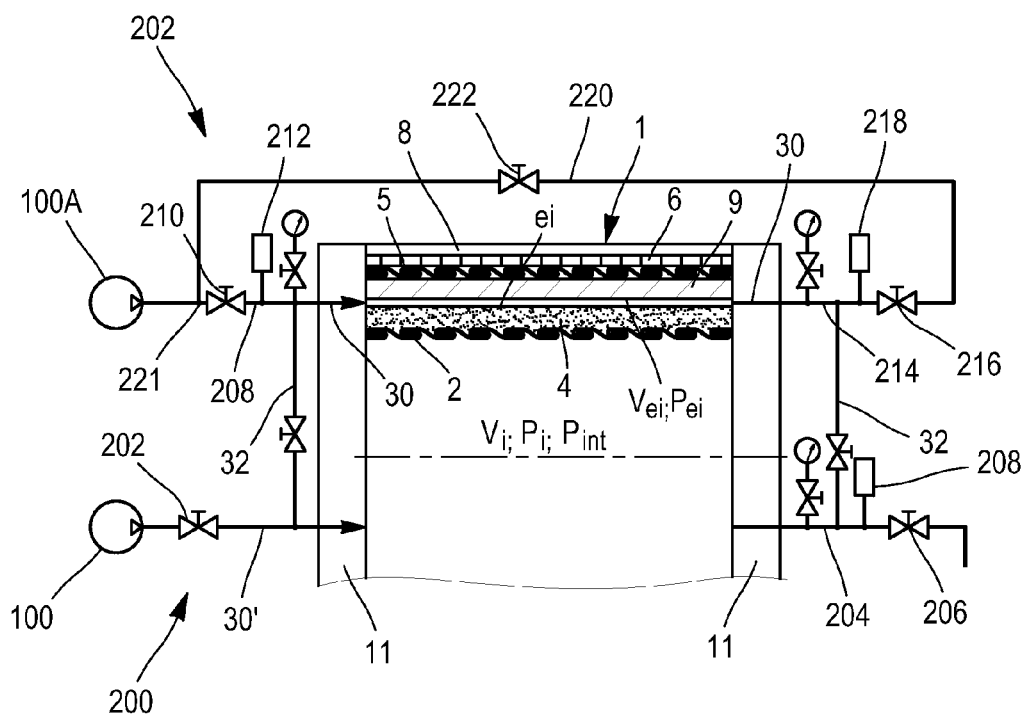
FIG. 7 is a diagram of a second method for FAT testing an interlayer space of a flexible tubular pipe, according to the invention.

A second test method is discussed with reference to FIG. 7. The structure of the pipe 1 is not visible in its integrality and is schematically described. The structure of the tubular pipe 1 is identical with the one described earlier in FIG. 6.

In this second test method, the circuit 200 for pressurizing the inner volume space $V_i$ and the circuit 202 for pressurizing the interlayer space ei are able to operate independently of each other.

The circuits 200, 202 remain advantageously connected together through bypass passages 32 located on either side of the pipe 1.

The circuit 200 for pressurizing the inner volume space V, includes a first pressurization system 100 and an additional channel 30', provided with a control valve 202 positioned at a first end of the pipe 1. It further includes an auxiliary depressurization channel 204 provided with a depressurization valve 206 mounted at a second end of the pipe 1.

The additional channel 30' crosses the end vault 11 of a first connecting endpiece 10 in order to open into the inner volume space V. A first bypass passage 32 is tapped on the additional channel 30'. The control valve 202 is interposed between the pressurization system 100 and the passage 32.

The depressurization channel 204 crosses the end vault 11 of the endpiece opposite to the endpiece in which the additional channel 30' is made. It is provided with a pressure sensor 208 positioned between the inner volume space $V_i$ and the depressurization valve 206. A bypass passage 32 is tapped on the depressurization pipe 204 between the control valve 206 and the end vault 11.

The circuit 202 for pressurizing the interlayer space ei includes a distinct pressurization system 100A from the system 100, an upstream pipe 208 provided with a control valve 210, a first axial channel 30 connected to the upstream pipe 208, the axial channel 30 crossing the tubular sleeve 15 located in a first endpiece 10 of the pipe 1, and a pressure sensor 212 mounted on the upstream pipe 208. It further includes a second axial channel 30 present in the tubular sleeve 15 of a second endpiece 10 of the pipe 1, a downstream pipe 214 provided with a valve 216 and a second pressure sensor 218 mounted on the downstream conduit 214.

The circuit 202 further includes a recirculation pipe 220 provided with a control valve 222 connecting a first point 221 of the upstream pipe 208 located between the pressurization system 100A and the first valve 210 on the one hand and the second valve 216, without passing through the pipe 1, on the other hand.

The second <<FAT>> test method first of all comprises the pressurization of the inner volume space Vi of the pipe 1, by means of the system 100 including a volumetric pump or a compressor, to a first <<FAT>> pressure $P_i$ determined beforehand.

The pressurization of the inner volume space $V_i$ gives the possibility of checking the seal of the pressure sheath 4 along its current length but also at the crimping of the latter in the endpieces 10.

Once the pressure $P_i$ is reached, the first valve 202 and the second valve 206 are actuated in order to lock the circuit for pressurizing the inner volume space $V_i$, it is awaited that the pressure within the pipe 1 is stabilized (advantageously according to the API 17J standard), and then the pressure variations are monitored by the pressure sensor 208.

Next, said inner volume space $V_i$ is depressurized from the pressure $P_i$ down to an intermediate pressure $P_{int}$ strictly lower than $P_i$ by actuation of the valve 206, so that the pressurization of the volume of the interlayer space ei may be possible. During this step, the inner volume space $V_i$ and the interlayer space ei are not connected together.

The value of the pressure $P_{int}$ is advantageously selected such that:

$$P_{int} = P_i - (P_{collapse} - 20\%) = P_i - (P_c * 0.8)$$

The collapse pressure $P_{collapse}$ of the internal carcass 2 depends on the geometry of the tubular pipe 1 which is subject to the <<FAT>> test.

The test is continued by maintaining pressurization of the inner volume space $V_i$, to the pressure $P_{int}$ by maintaining the valve 206 closed and the valve 210 is opened for allowing pressurization of the volume of the interlayer space $V_{ei}$, by the second system 100A comprising a second volumetric pump or a second compressor, to a pressure $P_{ei}$, strictly greater than $P_{int}$ and at most equal to $P_i$. Preferentially $P_{ei}$ is selected to be equal to $P_i$.

The interlayer space ei is connected to the system 100A through the upstream pipe 208 and through the axial channel 30 crossing the pierced tubular sleeve 15 as well as the end vault 11 of the connecting endpiece 10 (not shown).

Each of the ends of the interlayer space ei is connected, via at least one tubular sleeve 15 and at least one axial channel 30, to a sensor 212, 218 for measuring pressure. The pressure sensor 212, 218 allows measurement of the progression of the pressurization of the interlayer space ei. The pressurized fluid is injected at one of the two ends of the pipe 1, progresses over the whole of the current length of the pipe between the polymeric sheaths 4, 9 until it reaches the other end which is laid out as an open circuit. As soon as the fluid has flowed as far as the end opposite to the one which allowed introduction of said fluid, the pressure sensor 218 detects a pressure variation.

The circuit 202 for pressurization of the interlayer space ei is then closed via the valve 216 and then via the valve 210. The pressure indicated by the pressure sensor 212, 218 should normally remain substantially stable and with a value equal to the pressure $P_i$.

Subsequently, the pressure tends to become homogenized in the whole of the interlayer space ei. As explained hereinbefore, according to the recommendations mentioned in the normative document API 17J, a stabilization time is observed and the possible pressure fluctuations are monitored within the inner volume space $V_i$ and the intermediate space ei in order to make sure that the pipe 1 is stable in pressure.

As soon as the pipe 1 is estimated to be stable in pressure, it is held under pressure and the pressure difference between the pressure $P_i$ within the inner volume space $V_i$ and the pressure $P_{ei}$ within the interlayer space ei is frequently measured. This step gives the possibility of checking the integrity of the seal of the interlayer space ei as well as the integrity of the crimpings of the gap 25, at the end of each of the endpieces. The measured pressure difference is less than the pressure $P_{collapse}$ for collapsing the internal carcass 2.

Finally the tubular pipe 1 is depressurized by starting with depressurization of the interlayer space ei and then of the inner space V. The way how the pipe is depressurized is applied so that it gives the possibility of avoiding a risk of collapse of the internal carcass 2.

What is claimed is:

1. A flexible unbonded tubular pipe for transporting a petroleum fluid comprising:
    a first polymeric sheath;
    a second polymeric sheath;
    at least one tensile armor layer; and
    a polymeric sealing sheath
    the pipe having a first end and a second end and comprising, at its first end, a first connecting endpiece, and, at its second end, a second connecting endpiece,
    the first connecting endpiece and the second connecting end piece each comprising:
    an end vault and
    a tubular sleeve partly inserted between a free end of the first polymeric sheath and a free end of the second polymeric sheath, the tubular sleeve cooperating with a crimping assembly providing a sealing between the free end of the second polymeric sheath and the end vault, the tubular sleeve of the first connecting endpiece including a first drainer for draining the gases from a gap between the first polymeric sheath and the second polymeric sheath, towards an outside of the pipe,
    the tubular sleeve of the second connecting endpiece including a second drainer for draining the gases from the gap between the first polymeric sheath and the second polymeric sheath towards the outside of the pipe or towards an inside of the pipe.

2. The flexible unbonded tubular pipe according to claim 1, further comprising an internal carcass located inside the first polymeric sheath and the second polymeric sheath and a pressure vault between the second polymeric sheath and said at least one armor layer.

3. The flexible unbonded tubular pipe according to claim 1, wherein the first connecting endpiece comprises an additional crimping assembly providing a sealing function between the first polymeric sheath and the tubular sleeve.

4. The flexible unbonded tubular pipe according to claim 1, wherein the second drainer for draining the gases towards an inside of the pipe comprise at least one axial channel delimited in the thickness of the tubular sleeve and extending between end edges of the tubular sleeve.

5. The flexible unbonded tubular pipe according to claim 4, wherein the second drainer for draining the gases towards an inside of the pipe comprise several axial channels shifted relatively to each other in a circumference of the tubular sleeve.

6. The flexible unbonded tubular pipe according to claim 1, wherein the first drainer for draining the gases towards the outside comprises at least one axial channel made in the thickness of the tubular sleeve and extending between an end edge of the tubular sleeve placed in the gap between the first polymeric sheath and the second polymeric sheath and an annular internal chamber delimited between the tubular sleeve, the end vault and the free end of the second polymeric sheath.

7. The flexible unbonded tubular pipe according to claim 6, wherein the first drainer for draining the gases towards the outside comprise several axial channels shifted relatively to each other in a circumference of the tubular sleeve.

8. The flexible unbonded tubular pipe according to claim 6, wherein the annular internal chamber communicates with the outside of the pipe through a passage extending through the end vault and including an inlet orifice opening into the annular internal chamber and an outlet orifice opening outside of the pipe.

9. The flexible unbonded tubular pipe according to claim 8, wherein the outlet orifice of the passage is equipped with a differential valve.

10. The flexible unbonded tubular pipe according to claim 8, wherein the outlet orifice of the passage is connected to a system for measuring the pressure difference of the gas between the outlet orifice of the passage and an inside of the pipe and/or is connected to a gas analysis system.

11. The flexible unbonded tubular pipe according to claim 8, wherein the outlet orifice of the passage is connected to a system for measuring the temperature of the gases and/or to a system for measuring the flow rate of the gases.

12. A method for testing the seal of an interlayer space of a flexible unbonded tubular pipe according to claim 1, the method comprising:
    pressurizing an inner volume space ($V_i$) for fluid transport, to a first pressure ($P_i$);
    stabilizing the pressure ($P_i$) in the inner volume space ($V_i$); and
    measuring the pressure ($P_{ei}$) within an interlayer space (ei).

13. The test method according to claim 12, wherein the fluid used for pressurizing at least one space of the conduit is selected from a gas and a liquid.

14. The test method according to claim 12, comprising, after stabilizing the pressure ($P_i$) in the inner volume space ($V_i$) putting the inner volume space in fluidic communication with the interlayer space, and pressurizing the inner volume space and the interlayer space, to the pressure set when pressurizing an inner volume space ($V_i$) for fluid transport to a first pressure ($P_i$).

15. The test method according to claim 12, further comprising, after measuring the pressure ($P_{ei}$) within an interlayer space (ei), depressurizing the inner volume space, with the inner volume space and the interlayer space being connected together.

16. The test method according to claim 15, further comprising, after measuring the pressure ($P_{ei}$) within an interlayer space (ei) depressurizing the interlayer space by opening at least one tapping.

17. The test method according to claim 12, further comprising, between stabilizing the pressure ($P_i$) in the inner volume space ($V_i$) and measuring the pressure ($P_{ei}$) within an interlayer space (ei), measuring the pressure ($P_i$) within the inner volume space ($V_i$).

18. The test method according to claim 17, further comprising after measuring the pressure ($P_i$) within the inner volume space ($V_i$), depressurizing the inner space to an intermediate pressure below the first pressure.

19. The test method according to claim 17, further comprising, between stabilizing the pressure ($P_i$) in the inner volume space ($V_i$) and measuring the pressure ($P_{ei}$) within an interlayer space (ei), pressurizing the volume of the interlayer space to a pressure greater than the intermediate pressure and less than or equal to the first pressure set when pressurizing an inner volume space ($V_i$) for fluid transport to a first pressure ($P_i$).

20. The test method according to claim 17, further comprising, after measuring the pressure ($P_{ei}$) within an interlayer space (ei), depressurizing the interlayer space.

21. The test method according to claim 20, wherein depressurizing the interlayer space is followed by depressurization of the inner volume space.

* * * * *